United States Patent [19]
Gatti

[11] Patent Number: 5,012,654
[45] Date of Patent: May 7, 1991

[54] MEANS FOR COOLING DRINKS, ESPECIALLY IN CANS, IN CORRESPONDENCE OF AIR GRATINGS OF MOTOR-VEHICLE PASSENGER COMPARTMENTS

[76] Inventor: Stefano Gatti, Via G. Frua 7, 20146 Milano, Italy

[21] Appl. No.: 536,877

[22] Filed: Jun. 13, 1990

[30] Foreign Application Priority Data

Jun. 14, 1989 [IT] Italy ................. 21236 8/89

[51] Int. Cl.$^5$ ............................................. B60H 1/32
[52] U.S. Cl. ......................................... 62/244; 62/371; 62/377; 165/41
[58] Field of Search ............... 165/41; 62/239, 244, 62/377, 371

[56] References Cited

U.S. PATENT DOCUMENTS

| | | | |
|---|---|---|---|
| 4,653,289 | 3/1987 | Hodgetts | 62/244 X |
| 4,892,137 | 1/1990 | Bibik, Jr. | 62/244 X |
| 4,892,138 | 1/1990 | Bibik, Jr. | 62/244 X |

Primary Examiner—Lloyd L. King
Attorney, Agent, or Firm—Venable, Baetjer and Howard

[57] ABSTRACT

Means for cooling drinks, especially soft drinks and beer contained in cans, aboard a running motor vehicle, in correspondence of air gratings of the passenger compartment of said motor vehicle. It comprises, on the one hand, a support (1) consisting of a wire, bent at is center, so as to define a housing to contain a can (11) or the like, and whose ends (6), projecting at right angles from said housing, slightly diverging and elastically strainable, from elements, which can be inserted and engaged in the openings of an air grating (8) in the passenger compartment of a motor vehicle, on the other hand, a strip or cover (10) of soakable material, to be applied wet to the can (11) or the like before putting it on said support, exposed to the air jet going out through said grating (8).

2 Claims, 1 Drawing Sheet

U.S. Patent  May 7, 1991  5,012,654

MEANS FOR COOLING DRINKS, ESPECIALLY IN CANS, IN CORRESPONDENCE OF AIR GRATINGS OF MOTOR-VEHICLE PASSENGER COMPARTMENTS

BACKGROUND OF THE INVENTION

The present invention relates to simple and practical means for cooling drinks, especially soft drinks and beer contained in cans, aboard a running motor vehicle, in correspondence of air gratings of the passenger compartment of said motor vehicle.

It is well known the refreshment caused by a cool drink during a journey, especially in warm season, and it is known as well that, for getting this refreshment, a car driver is obliged to stop its car and stay for some time at a public place (which is often crowded, especially when located in a service area of a speedway) which is very troublesome and time-consuming in case of a long journey or during rush-hours. Carrying drink cans, even chilled, with oneself does not solve the problem, because they will get irremediably warm in a short time, thus making the drink completely disagreeable.

It is an object of the present invention to provide car drivers with extremely simple and practical means, which allows to keep cool or to cool quickly, aboard motor vehicles, drinks contained in cans or similar containers, by making use of the air jet, which is introduced into the passenger compartment through the air gratings because of the motion, or, when the vehicle is stationary, by the fan.

SUMMARY OF THE INVENTION

This means comprises, on the one hand, a support consisting of a wire, bent at its centre, so as to define a housing to contain a can or the like, and whose ends, projecting at right angles from said housing, slightly diverging and elastically strainable, from elements, which can be inserted and engaged in the openings of an air grating in the passenger compartment of a motor vehicle, on the other hand, a strip or cover of soakable material, to be applied wet to the can or the like before putting it on said support, exposed to the air jet going out through said grating.

BRIEF DESCRIPTION OF THE DRAWING

Now the invention will be described in more detail, referring to an embodiment showen on the accompanying drawing, in which.

DESCRIPTION OF THE PREFERRED EMBODIMENT

Figure 1:
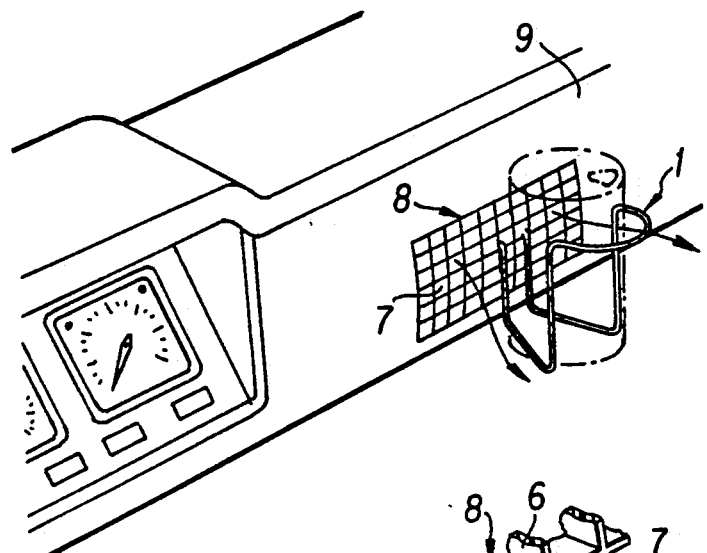
FIG. 1 shows the means according to the invention applied to the air grating of the dashboard of a car.
Figure 2:
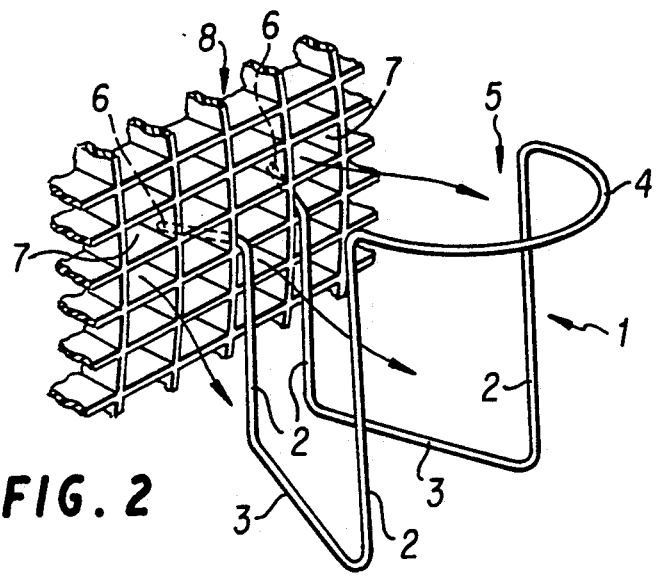
FIG. 2 shows the support forming part of the means according to the invention, applied to said grating.
Figure 3:
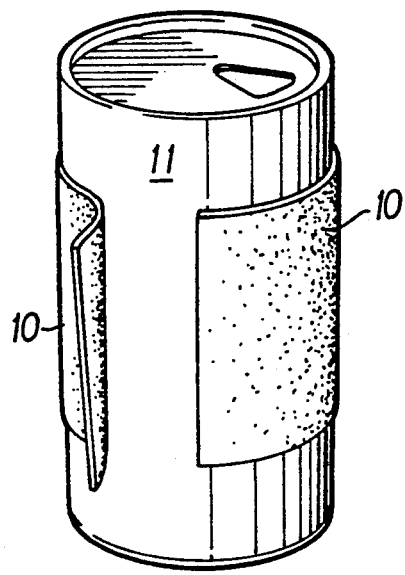
FIG. 3 shows a can to be cooled, when the strip of soakable material, suitably wet, is being applied thereto.

Referring to the drawing, the means according to the invention comprises a wire support 1, apt to contain in vertical position a soft drink or beer can, or another container, such as a glass, paper cup, bottle or the like, without any particular problem. This support consists of a wire, repeatedly bent at its centre, so as to define— with four vertical legs 2, two cross members 3 and one curved top edge 4—a housing 5 for said can or the like. The ends 6 of the wire, projecting at right angles from said housing 5, slightly diverging and elastically trainable, form elements, which can be easily inserted and engaged in the openings 7 of an air grating 8 (e.g. of dashboard 9) of the passenger compartment of a motor vehicle.

Figure 4:
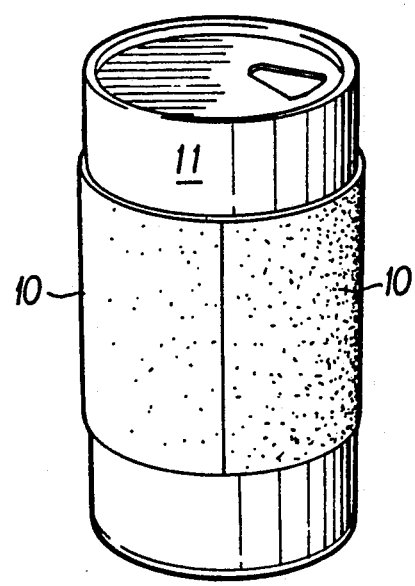
FIG. 4 shows the same can with said strip applied to it.

The means according to the invention comprises, moreover, a soakable material strip, which is applied, slightly wet, to the container of the drink to be cooled or kep cool, typically a can 11, by winding said strip around the can, so as to enclose it wholly, as shown by FIG. 4.

Alternatively to strip 10 it is possible to use a cylindrical cover of the same soakable material, if required provided with a minimum elasticity, which is applied to the can 11 or other container by putting it on this from one end, after being slightly wetted.

In use, the support 1 is easily applied to the grating 8 by simple elastic strain of the ends of the wire forming the support itself. Pratically, it is sufficient to move the wire ends 6 near each other, so that they will tend to move away from each other, to fasten support 1 on grating 8. This can be done immediately before using the support itself, on departure, or even at the beginning of the warm season, because the support, owing to its little volume and negligible surface, causes practically no nuisance to the passengers of the car (even of a small one), and it does not disturb, when empty, the air flow in the passenger compartment.

When it is desired to cool a warm drink or keep cool a just bought drink, one applies to its container, commonly a can 11, the soakable material strip 10, previously slightly wetted with water or other liquid, e.g. the contents of the can itself. Soon afterwards the can (or other container) is put in support 1, thus exposing it to the air stream going out through grating 8.

The quick evaporation of the liquid, with which the strip 10 (or equivalent cover) is soaked, caused by the air stream coming from grating 8 and colliding with said strip, draws heat from can 10 an its content, thus cooling quickly the latter, which is the desired result. Not only a cool drink remains so, but even a warm drink is quickly cooled and made drinkable with pleasure by the passenger. Of course, this happens even when the room temperature is very high or when the car is standing and the fan is operated, which causes air to flow through grating 8; moreover, in this case the evaporation of the liquid with the strip 10 is soaked takes place more quickly, thus causing a quicker drop in the temperature of the can and its contents.

The means provided by this invention are very simple and practical, as it can be easily verified. They can be used for a long time and repeatedly, thus allowing to keep cool any drink available in the car, at any time and without stopping the car. Owing to the nature of the material with which the soakable strip or cover are made, seizing and holding the container surrounded by them, when drinking the cooled drink, involves no problem or nuisance. The fact that said strip or cover are damp or slightly wet is by no means disagreeable, on the contrary, it may be agreeable in warm season.

It is intended that the same benefits and advantages can be obtained with variants of the described and illustrated means, which are within the capacity of those skilled in the art. Thus the shape of support 1 and the type and shape characteristics of strip 10 can vary still remaining in the scope of the invention.

It is intended as well that the use of the described and illustrated means is not necessarily limited to motor vehicles.

The wire support with the can according to the invention can be applied to the grating of any ventilation means, which allows the insertion of the ends of the support itself, thus extending to any place and circumstance the possibility of using the means according to the invention.

I claim:

1. Means for cooling drinks, especially soft drinks and beer contained in cans, aboard a running motor vehicle, in correspondence of air gratings of the passenger compartment of said motor vehicle, characterized in that it comprises, on the one hand, support consisting of a wire, bent at its centre, so as to define a housing to contain a can or the like, and whose ends, projecting at right angles from said housing, slightly diverging and elastically strainable, form elements, which can be inserted and engaged in the openings of an air grating in the passenger compartment of a motor vehicle, on the other hand, a strip or cover of soakable material, to be applied wet to the can or the like before putting it on said support, exposed to the air jet going out through said grating.

2. Means for cooling drinks according to claim 1, wherein said wire support comprises four vertical legs, connected at their bottom sides by cross members, and a curved top edge connecting two of said legs, the other two legs ending with said right-angle ends.

* * * * *